Feb. 18, 1947.  E. GENIN  2,416,092
MEANS FOR THE SUPPLEMENTARY PROPULSION OF CYCLES
BY THE OSCILLATION OF THE HANDLEBARS
Filed Feb. 19, 1940

INVENTOR
ERNEST GENIN
PER
ATTORNEY

Patented Feb. 18, 1947

2,416,092

UNITED STATES PATENT OFFICE 2,416,092

MEANS FOR THE SUPPLEMENTARY PROPULSION OF CYCLES BY THE OSCILLATION OF THE HANDLE BARS

Ernest Genin, Brussels, Belgium

Application February 19, 1940, Serial No. 319,722
In Belgium March 15, 1939

2 Claims. (Cl. 280—234)

The present invention relates to a means for the supplementary propulsion of cycles by the oscillation of the handlebars, the oscillating movement being effected about an axis perpendicular to the handlebar and central of the cycle.

The present apparatus consists essentially in that to each side of the handlebars a chain is fixed which after passing over a guiding pinion, is directed around a driving pinion and gives the cycle a forward movement for each oscillation of the handlebar, the tension of the chains being assured by a spring attached to an appropriate place on the frame, means being provided to protect the chains between the guiding pinions and the driving pinions, to allow free wheeling and to lock the handlebars during free wheeling.

Reference will now be made to the accompanying drawing which shows several embodiments of the present invention, and in which.

Figure 1:
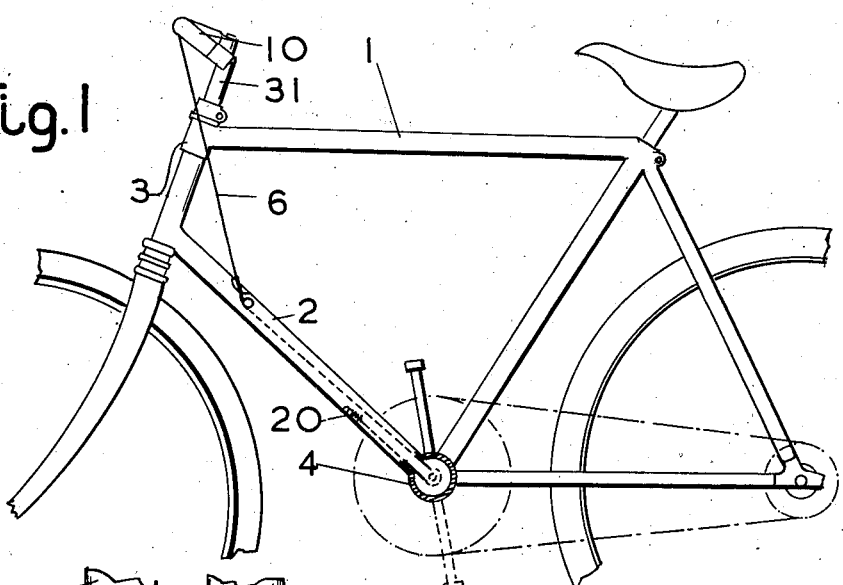
Figure 1 shows in elevation a bicycle provided with apparatus according to the present invention.
Figure 2:
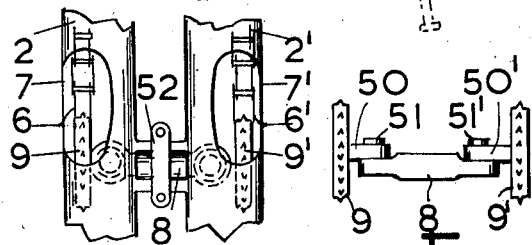
Figure 2 shows part of the lower or down tubes with guiding pinions for the chains.
Figure 3:
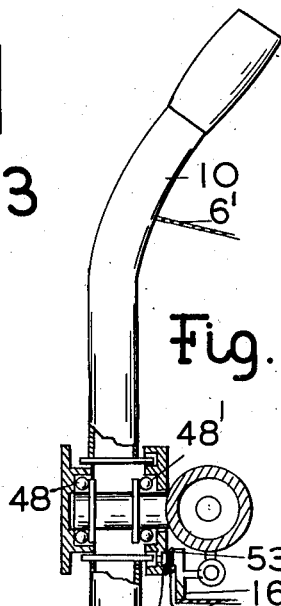
Figure 3 is an elevation showing the method of mounting the chain guiding pinions.
Figure 4:
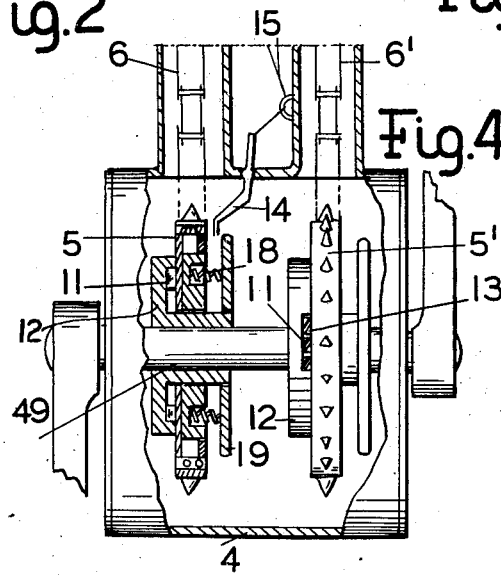
Figure 4 is a part section of the body of the bottom bracket.
Figure 5:
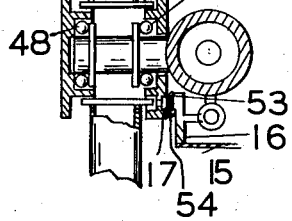
Figure 5 is a plan of part of the oscillating handlebar.

According to the embodiment of the invention shown in Figures 1 to 5, the frame 1 is provided with double down tubes 2 and 2¹ joining the head 3 and the bottom bracket 4.

In the head 3, or the handlebar support 31, a handlebar 10 which carries on each side a chain 6, 6¹ is oscillatably mounted on ball bearings 48, 48¹. Each of the chains 6, 6¹ passes through an opening 7 or 7¹ provided in the tubes 2 and 2¹ where each is guided over a small pinion 9 or 9¹ and then passes on to a driving pinion fixed on the bracket spindle 49. The pinions 9, 9¹ are freely mounted on plates 50, 50¹ pivoting about spindles 51, 51¹ carried in a support 8 fixed to the frame 1 by a stirrup 52. The chains are thus kept in a good position whatever the turning movement of the handlebars.

The driving pinions 5 and 5¹ each have a set of teeth 13 which are kept in contact with another set 11 formed on a ring 12 integral with the bracket spindle 49 by springs 18 held on the other side by a nut 19.

By reason of the inclination of the teeth there is no driving when free wheeling takes place and the teeth 11 and 13 separate, thus causing compression of the springs 18. The disconnection of the drive of the pinion 5 may be utilised to effect a locking of the handlebars.

The locking of the handlebar is realised with the help of a lever 14, pivoting under the effect of lateral movement of the pinion 5, causing a pulling on a cable 15.

The other end of the cable 15 is connected with an end of a lever 16 whose lug 53 is normally held away from a socket 17 by a spring 54, all movement on the cable 15 compresses the spring 54 assuring the locking of the handlebar by the introduction of the lug 53 in the socket 17.

The chains 6, 6¹ are parallel in the down tubes 2 and 2¹ which cause flawless lines of chain, the ends of the chains which pass around the pinions 5 and 5¹ being connected with springs 20 which keep the chains tight thus avoiding any wavering of the chains in the frame tubes, while permitting the chains to be displaced by oscillation of the handlebars.

It will be obvious that in order to diminish the weight, the parts of the chains not coming in contact with one of the pinions may be replaced by cables or the like.

I claim:

1. Apparatus for the supplementary propulsion of cycles by the oscillation of the handlebars comprising two driving pinions mounted on a rotary part of the cycle and arranged to drive in one direction only, a chain passing partly around each driving pinion, said chains being attached respectively to the two sides of the handlebars, means for mounting the handlebars so that they may oscillate about their mid-point, guiding pinions supported on the cycle frame for maintaining the chains in alignment with the driving pinions displaced laterally on said rotary part of the cycle when the drive is disengaged, including means actuated by said displacement to lock the handlebars against oscillatory movement, and means for maintaining the chains in tension.

2. Apparatus for the supplementary propulsion of cycles by the oscillation of the handlebars comprising two unidirectional driving pinions mounted on the pedal spindle, a chain passing partly around each driving pinion, said chains being attached respectively at one end to the two sides of the handlebars, means for mounting the handlebars for oscillation about their mid-point whereby said pinions may be alternately driven, guiding pinions supported in the machine frame by which the chains coming from the handlebars are aligned with the driving pinions through the frame tubes, springs for maintaining said chains under tension, said driving pinions driving the pedal spindle through free-wheel devices and are displaced laterally when free-wheeling, including a socket in the handlebar, a spring-controlled plunger adapted to enter said socket to lock the handlebar against oscillatory movement, a lever pivoted adjacent a driving pinion and a connection between said plunger and lever, the arrangement being such that displacement of the driving pinion when free-wheeling rocks the lever and locks the handlebars.

ERNEST GENIN.

REFERENCES CITED

The following references are of record in the file of this patent:

UNITED STATES PATENTS

| Number | Name | Date |
|---|---|---|
| 690,180 | Pierson | Dec. 31, 1901 |
| 701,761 | Olson | June 3, 1902 |
| 850,746 | Garza | Apr. 16, 1907 |
| 628,426 | Woodruff | July 4, 1899 |
| 585,421 | Bemis | June 29, 1897 |
| 616,021 | Schaibly | Dec. 13, 1897 |
| 438,684 | L'Eplattenier | Oct. 21, 1890 |
| 270,913 | Spencer | Jan. 23, 1883 |
| 511,479 | Westbrook | Dec. 26, 1893 |

FOREIGN PATENTS

| Number | Country | Date |
|---|---|---|
| 96,518 | German | Mar. 23, 1898 |
| 494,874 | British | Nov. 2, 1938 |
| 17,679 | British | A. D. 1901 |
| 55,672 | German | June 14, 1890 |